(12) United States Patent
Shimokita et al.

(10) Patent No.: US 9,981,859 B2
(45) Date of Patent: May 29, 2018

(54) POSITIVE ELECTRODE COMPOSITION FOR NON-AQUEOUS ELECTROLYTE SECONDARY BATTERY AND METHOD OF MANUFACTURING THEREOF

(71) Applicant: NICHIA CORPORATION, Anan-shi, Tokushima (JP)

(72) Inventors: Kosuke Shimokita, Itano-gun (JP); Makoto Shimahara, Tokushima (JP); Kiyofumi Inouchi, Anan (JP)

(73) Assignee: NICHIA CORPORATION, Anan-shi (JP)

( * ) Notice: Subject to any disclaimer, the term of this patent is extended or adjusted under 35 U.S.C. 154(b) by 366 days.

(21) Appl. No.: 14/526,577

(22) Filed: Oct. 29, 2014

(65) Prior Publication Data

US 2015/0118564 A1  Apr. 30, 2015

(30) Foreign Application Priority Data

Oct. 29, 2013  (JP) .................................. 2013-223784
Oct. 28, 2014  (JP) .................................. 2014-219323

(51) Int. Cl.
*H01M 4/36* (2006.01)
*H01M 4/505* (2010.01)
*H01M 4/525* (2010.01)
*C01G 53/00* (2006.01)
*H01M 10/0525* (2010.01)
*H01M 4/02* (2006.01)

(52) U.S. Cl.
CPC ............ *C01G 53/50* (2013.01); *H01M 4/366* (2013.01); *H01M 4/505* (2013.01); *H01M 4/525* (2013.01); *H01M 10/0525* (2013.01); *C01P 2002/50* (2013.01); *C01P 2006/40* (2013.01); *H01M 2004/028* (2013.01); *H01M 2220/20* (2013.01); *H01M 2220/30* (2013.01); *Y02E 60/122* (2013.01)

(58) Field of Classification Search
CPC .. H01M 4/0402; H01M 4/0471; H01M 4/131; H01M 4/1391; H01M 4/362; H01M 4/366; H01M 4/505; H01M 4/525
See application file for complete search history.

(56) References Cited

U.S. PATENT DOCUMENTS

| | | | |
|---|---|---|---|
| 2002/0071991 A1 | 6/2002 | Kweon et al. | |
| 2002/0110736 A1 | 8/2002 | Kweon et al. | |
| 2003/0129495 A1 | 7/2003 | Yamato et al. | |
| 2008/0118835 A1* | 5/2008 | Hur ....... | H01M 4/131 429/219 |
| 2009/0029249 A1* | 1/2009 | Takami ................. | H01M 4/366 429/188 |
| 2009/0280412 A1* | 11/2009 | Imanari .............. | C01G 45/1228 429/221 |
| 2013/0277604 A1 | 10/2013 | Shimokita et al. | |

FOREIGN PATENT DOCUMENTS

| | | |
|---|---|---|
| JP | H06-283174 A | 10/1994 |
| JP | 2002-164053 | 6/2002 |
| JP | 2008-181839 | 8/2008 |
| JP | 2009-146739 A | 7/2009 |
| JP | 2009-152214 A | 7/2009 |
| JP | 2010-40382 | 2/2010 |
| JP | 2010-040383 A | 2/2010 |
| JP | 2010-055788 A | 3/2010 |
| JP | 2013-239434 | 11/2013 |
| WO | WO 02/041419 A1 | 5/2002 |

OTHER PUBLICATIONS

Machine translation of JP 2010-040382, published on Feb. 18, 2010.*
Boric Acid, www.chemicalland21.com, date unknown.*
Machine translation of JP 2009-152214 published on Jul. 9, 2009 (Year: 2009).*
Machine translation of JP 06-283174 published on Oct. 7, 1994 (Year: 1994).*
K. Nakamura et al., "Li+ Ionic Diffusion in LiCuO2 Exposed to Heating-Cooling Cycles." Journal of Physical Society of Japan, vol. 79 (2010) Suppl. A, pp. 80-83.
K. Nakamura et al., "Power law behaviors of electrical conductivities in lithium manganese oxides." Solid State Ionics, vol. 225 (2012) pp. 538-541.

* cited by examiner

*Primary Examiner* — Anca Eoff
(74) *Attorney, Agent, or Firm* — Andrews Kurth Kenyon LLP

(57) ABSTRACT

The present invention provides a positive electrode composition for a non-aqueous electrolyte secondary battery, wherein the composition includes a lithium-transition metal composite oxide represented by the following compositional formula:

$$Li_aNi_{1-x-y}Co_xM^1_yM^2_zMo_\alpha Nb_\beta O_2$$

wherein $1.00 \le a \le 1.50$, $0.00 \le x \le 0.50$, $0.00 \le y \le 0.50$, $0.000 \le z \le 0.020$, $0.002 \le \alpha \le 0.020$, $0.002 \le \beta \le 0.020$, and $0.00 \le x+y \le 0.70$, $M^1$ represents at least one element selected from the group consisting of Mn and Al, and $M^2$ represents at least one element selected from the group consisting of Zr, Ti, Mg, Ta, and V, and a boron compound including at least boron and oxygen.

14 Claims, No Drawings

POSITIVE ELECTRODE COMPOSITION FOR NON-AQUEOUS ELECTROLYTE SECONDARY BATTERY AND METHOD OF MANUFACTURING THEREOF

CROSS-REFERENCE TO RELATED APPLICATIONS

This application claims priority under 35 USC 119 from Japanese patent Application No. 2013-223784, filed on Oct. 29, 2013 and Japanese patent Application No. 2014-219323, filed on Oct. 28, 2014. The entire disclosure of Japanese Patent Application No. 2013-223784 and No. 2014-219323 are hereby incorporated herein by reference.

BACKGROUND OF THE INVENTION

Field of the Invention

The present invention relates to a positive electrode composition for a non-aqueous electrolyte secondary battery and a method for producing the same.

Description of the Related Art

In recent years, mobile electric devices, such as VTRs, cell phones, and laptop personal computers, have spread and are miniaturized, and, as a power source for the mobile device, a non-aqueous electrolyte secondary battery, such as a lithium-ion secondary battery, is used. Further, recently, environmental problems must be dealt with and therefore, the non-aqueous electrolyte secondary battery is attracting attention as a power battery for, e.g., an electric vehicle.

As a positive electrode active material for a lithium secondary battery, $LiCoO_2$ (lithium cobalt oxide) is generally widely employed, in which $LiCoO_2$ is able to constitute a secondary battery at a level of 4 V. When using $LiCoO_2$ as a positive electrode active material for a secondary battery, the resultant secondary battery achieves a discharge capacity of about 160 mAh/g, and such a secondary battery has been practically used.

Cobalt, which is a raw material for $LiCoO_2$, is a resource that is scarce and unevenly distributed, and therefore $LiCoO_2$ as a positive electrode active material has disadvantages not only in that the cost tends to increase, but also in that the supply of the raw material for the active material is likely to be unstable. In consideration of such circumstances, a lithium-transition metal composite oxide having a layer structure, such as nickel-cobalt-lithium manganate, which is obtained from $LiCoO_2$ by substituting a part of Co in the $LiCoO_2$ by another metal element, such as Ni or Mn, has been developed. As a metal element other than the above metal elements for substituting Co, for example, molybdenum is selected depending on the purpose.

International Patent Application Publication No. 02/041419 proposes a technique in which, with respect to a lithium composite oxide including nickel, cobalt, and manganese as essential components, a metal element, such as molybdenum, is introduced to the composition of the lithium composite oxide so that a composite oxide of the introduced metal element and lithium exhibits a diffraction peak, improving the heat stability of the battery in a charged state at a high capacity.

Japanese Patent Publication No. 2008-181839 proposes a technique in which, by using a composite oxide comprising lithium, nickel, cobalt, and a specific additive element as essential components, the positive electrode active material is improved in the heat stability and charge-discharge capacity. As examples of additive elements, combinations of elements, such as Nb+Mn+Al, and Mo+Mn, are specifically disclosed.

On the other hand, in accordance with various purposes, a technique for mixing a boron compound, such as boric acid, with a lithium-transition metal composite oxide, and a technique for allowing a boron compound to be present on the surface of a lithium-transition metal composite oxide have been known.

For example, Japanese Patent Publication No. 2009-146739 discloses a positive electrode active material obtained by coating composite oxide particles, such as $Li_{1.03}Ni_{0.77}Co_{0.20}Al_{0.03}O_2$, with a boric acid compound, such as ammonium pentaborate, and subjecting the resultant particles to heat treatment. The positive electrode active material obtained as mentioned above is expected to enable a secondary battery to be increased in the capacity and improved in the charge-discharge efficiency.

Japanese Patent Publication No. 2002-164053 discloses a positive electrode active material having, on a core including a lithium compound, such as $Li_{1.03}Ni_{0.69}Mn_{0.19}Co_{0.1}Al_{0.07}Mg_{0.07}O_2$, formed a surface treatment layer including a coating element, such as boron. As a coating method, specifically, a method is disclosed in which a core is treated with an alkoxide solution of a coating element and then subjected to heat treatment. The positive electrode active material obtained as mentioned above is expected to be improved in the heat stability.

SUMMARY OF THE INVENTION

The positive electrode composition for a non-aqueous electrolyte secondary battery includes a lithium-transition metal composite oxide represented by the following compositional formula:

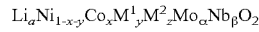

$$Li_aNi_{1-x-y}Co_xM^1_yM^2_zMo_\alpha Nb_\beta O_2$$

in which $1.00 \le a \le 1.50$, $0.00 \le x \le 0.50$, $0.00 \le y \le 0.50$, $0.000 \le z \le 0.020$, $0.002 \le \alpha \le 0.020$, $0.002 \le \beta \le 0.020$, and $0.00 \le x+y \le 0.70$, $M^1$ represents at least one element selected from the group consisting of Mn and Al, and $M^2$ represents at least one element selected from the group consisting of Zr, Ti, Mg, Ta, and V, and a boron compound including at least boron and oxygen.

A non-aqueous electrolyte secondary battery including a positive electrode including the positive electrode composition for a non-aqueous electrolyte secondary battery can achieve both excellent heat stability and excellent cycle characteristics.

DETAILED DESCRIPTION OF THE INVENTION

The present inventors have found that a lithium-transition metal composite oxide of a layer structure containing molybdenum has excellent heat stability, on the other hand tends to deteriorate in the cycle characteristics. It has been considered that it is difficult to substitute the improvement of the heat stability by molybdenum for another technique, and that it is difficult to achieve both excellent heat stability and excellent cycle characteristics. Further, in Japanese Patent Publication No. 2008-181839, there is no specific description about a combination of Mo and Nb, and Mo and Nb are individually handled as elements equivalent to the other additive elements.

In view of the above, the present invention has been made. An object of the present embodiment is to provide a positive electrode composition which enables a non-aqueous electrolyte secondary battery to achieve both excellent heat stability and excellent cycle characteristics.

For achieving the above object, the present inventors have conducted extensive and intensive studies, and the present invention has been completed. The present inventors have found that, by using to a positive electrode a positive electrode composition which includes a lithium-transition metal composite oxide having a layer structure and including nickel, molybdenum, and niobium as essential components, and a boron compound, it is possible to obtain a non-aqueous electrolyte secondary battery which achieves satisfactory heat stability without sacrificing the cycle characteristics.

The positive electrode composition for a non-aqueous electrolyte secondary battery according to the present embodiment includes a lithium-transition metal composite oxide represented by the following compositional formula:

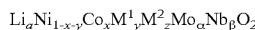
$Li_aNi_{1-x-y}Co_xM^1_yM^2_zMo_\alpha Nb_\beta O_2$ in which a, x, y, z, α, and β satisfy the respective relationships: $1.00 \leq a \leq 1.50$, $0.00 \leq x \leq 0.50$, $0.00 \leq y \leq 0.50$, $0.000 \leq z \leq 0.020$, $0.002 \leq \alpha \leq 0.020$, $0.002 \leq \beta \leq 0.020$, and $0.00 \leq x+y \leq 0.70$, $M^1$ represents at least one element selected from the group consisting of Mn and Al, and $M^2$ represents at least one element selected from the group consisting of Zr, Ti, Mg, Ta, and V, and a boron compound including at least boron and oxygen.

The method according to the present embodiment for producing a positive electrode composition for a non-aqueous electrolyte secondary battery includes: providing a lithium-transition metal composite oxide represented by the following compositional formula:

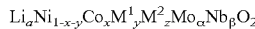
$Li_aNi_{1-x-y}Co_xM^1_yM^2_zMo_\alpha Nb_\beta O_2$ in which $1.00 \leq a \leq 1.50$, $0.00 \leq x \leq 0.50$, $0.00 \leq y \leq 0.50$, $0.000 \leq z \leq 0.020$, $0.002 \leq \alpha \leq 0.020$, $0.002 \leq \beta \leq 0.020$, and $0.00 \leq x+y \leq 0.70$, $M^1$ represents at least one element selected from the group consisting of Mn and Al, and $M^2$ represents at least one element selected from the group consisting of Zr, Ti, Mg, Ta, and V;
mixing the provided lithium-transition metal composite oxide with a raw material compound for a boron compound to obtain a raw material mixture; and calcining the obtained raw material mixture.

According to the present embodiment, there can be provided a positive electrode composition which enables a non-aqueous electrolyte secondary battery to achieve both excellent heat stability and excellent cycle characteristics.

In the present specification, the term "step" includes not only an independent step but also a step which can achieve the desired object of the step even through the step cannot be clearly distinguished from the other steps. With respect to the content of the component in the composition, when plural substances corresponding to the components of the composition are present in the composition, the content means a total amount of the plurality of substances present in the composition unless otherwise specified.

Hereinbelow, the positive electrode composition of the present embodiment will be described in detail with reference to the following embodiments and Examples, which should not be construed as limiting the scope of the present invention.

Positive Electrode Composition for Non-Aqueous Electrolyte Secondary Battery

The positive electrode composition for a non-aqueous electrolyte secondary battery (hereinafter, may be referred to simply as "positive electrode composition") includes a lithium-transition metal composite oxide represented by the compositional formula below, and a boron compound including at least boron and oxygen.

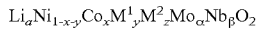
$Li_aNi_{1-x-y}Co_xM^1_yM^2_zMo_\alpha Nb_\beta O_2$

In the compositional formula above, a, x, y, z, α, and β satisfy the respective relationships: $1.00 \leq a \leq 1.50$, $0.00 \leq x \leq 0.50$, $0.00 \leq y \leq 0.50$, $0.000 \leq z \leq 0.020$, $0.002 \leq \alpha \leq 0.020$, $0.002 \leq \beta \leq 0.020$, and $0.00 \leq x+y \leq 0.70$, $M^1$ represents at least one element selected from the group consisting of Mn and Al, and $M^2$ represents at least one element selected from the group consisting of Zr, Ti, Mg, Ta, and V.

A non-aqueous electrolyte secondary battery including a positive electrode including the above-mentioned positive electrode composition as a positive electrode active material can achieve both excellent heat stability and excellent cycle characteristics, and further has improved output characteristics.

Lithium-Transition Metal Composite Oxide

The lithium-transition metal composite oxide includes nickel as an essential element, and further contains molybdenum and niobium in a predetermined ratio in the composition. Further, according to the purpose, a part of the nickel site may be substituted by, for example, cobalt (Co), manganese (Mn), or aluminum (Al).

When substituting a part of the nickel site by cobalt, up to 50 mol % of the nickel can be substituted. When the substitution amount for nickel is 50 mol % or less, an increase of the cost of the production can be effectively suppressed. Taking the balance between various properties into consideration, a preferred substitution amount for nickel is 5 to 35 mol %.

When substituting a part of the nickel site by at least one element $M^1$ selected from the group consisting of manganese and aluminum, up to 50 mol % of the nickel can be replaced. When the substitution amount for nickel is 50 mol % or less, it is likely that more satisfactory output characteristics and charge-discharge capacity can be obtained. When the nickel amount in the nickel site is too small, the charge-discharge capacity tends to be reduced, and therefore the total substitution amount for the nickel site is 70 mol % or less. Taking the balance between various properties into consideration, the total substitution amount for the nickel site is preferably 20 to 60 mol %. The total substitution amount for the nickel site means the total of the substitution amount by cobalt and the substitution amount by element $M^1$.

For improving the safety and heat stability, the lithium-transition metal composite oxide further contains molybdenum (Mo). When the amount of the molybdenum contained in the lithium-transition metal composite oxide is too small, a satisfactory effect of the molybdenum is not obtained. On the other hand, when the amount of the molybdenum contained is too large, the cycle characteristics become extremely poor, so that even when the below-mentioned niobium and boron compound are contained, satisfactory cycle characteristics tend to be difficult to achieve. Further, there may result in failure that molybdenum contained in too large an amount inhibits the improvements of properties by the other elements. From the above viewpoints, the amount of the molybdenum contained in the lithium-transition metal composite oxide is 0.2 to 2.0 mol %, preferably in the range of from 0.3 to 1 mol %.

Molybdenum tends to cause the cycle characteristics to be poor, and therefore the lithium-transition metal composite oxide further contains niobium (Nb). By virtue of the niobium contained, an adverse effect of molybdenum on the cycle characteristics is suppressed. When the amount of the niobium contained in the lithium-transition metal composite oxide is too small, a satisfactory effect of the niobium is not obtained. On the other hand, niobium can be dissolved only in a certain amount in the composition of the lithium-transition metal composite oxide and therefore, when the amount of the niobium contained in the lithium-transition metal composite oxide is too large, there may result in failure that the niobium element which is not dissolved rather inhibits the improvements of properties by the other elements. From the above viewpoints, the amount of the niobium contained in the lithium-transition metal composite oxide is 0.2 to 2.0 mol %, preferably in the range of from 0.3 to 1 mol %.

The lithium-transition metal composite oxide may further contain at least one element $M^2$ selected from the group consisting of zirconium (Zr), titanium (Ti), magnesium (Mg), tantalum (Ta), and vanadium (V). When the amount of the element $M^2$ contained in the lithium-transition metal composite oxide is 2 mol % or less, the various objects aimed at by the respective elements $M^2$ can be achieved without inhibiting the improvements of properties by the other elements. For example, zirconium further improves the storage properties, titanium and magnesium further improve the cycle characteristics, and vanadium further improves the safety.

When the amount of the lithium contained in the lithium-transition metal composite oxide is large, it is likely that the output characteristics are improved. However, the lithium-transition metal composite oxide containing lithium in too large an amount tends to be difficult to synthesize. Even, when synthesis is achieved, excessive calcination tend to follow, and handling of the oxide becomes difficult. From the above viewpoints, the amount of the lithium contained is 100 to 150 mol %, based on the mole of the element in the nickel site. Taking into consideration, for example, the balance between the properties and ease of the synthesis, the amount of the lithium contained is preferably 105 to 125 mol %.

Thus, the lithium-transition metal composite oxide in the positive electrode composition of the present embodiment is represented by the compositional formula: $Li_aNi_{1-x-y}Co_xM^1_yM^2_zMo_\alpha Nb_\beta O_2$, in which a, x, y, z, α, and β satisfy the respective relationships: $1.00 \le a \le 1.50$, $0.00 \le x \le 0.50$, $0.00 \le y \le 0.50$, $0.000 \le z \le 0.020$, $0.002 \le \alpha \le 0.020$, $0.002 \le \beta \le 0.020$, and $0.00 \le x+y \le 0.70$, $M^1$ represents at least one element selected from the group consisting of Mn and Al, and $M^2$ represents at least one element selected from the group consisting of Zr, Ti, Mg, Ta, and V.

With respect to the above-mentioned molybdenum and niobium, the composition having those contained therein is described for convenience's sake. An adverse effect of molybdenum on the cycle characteristics cannot be satisfactorily suppressed only by the niobium contained, and therefore the below-mentioned boron compound is further added to the lithium-transition metal composite oxide to obtain the positive electrode composition.

Boron Compound

In the positive electrode composition of the present embodiment, the boron compound includes at least boron and oxygen. The boron compound contained in the positive electrode composition can effectively suppress dissolution of, for example, molybdenum from the lithium-transition metal composite oxide. The reason for this is presumed that, for example, the boron compound is more likely to react with an electrolyte than molybdenum. This effect, however, has a limitation and hence, as mentioned above, the lithium-transition metal composite oxide contains niobium in a predetermined amount. On the other hand, only the niobium contained in the lithium-transition metal composite oxide is considered to be unsatisfactory in the effect of suppressing the dissolution of molybdenum because, for example, niobium per se can be dissolved in the electrolyte. That is, when the lithium-transition metal composite oxide containing niobium as well as molybdenum and the boron compound together constitute the positive electrode composition, an unexpected synergy is obtained from the boron compound and niobium and molybdenum, so that both satisfactory heat stability and satisfactory cycle characteristics can be achieved.

The positive electrode composition including the boron compound is obtained by, for example, satisfactorily mixing the lithium-transition metal composite oxide and a raw material compound for the boron compound with each other. The form of the boron compound in the positive electrode composition has not been elucidated. However, it is presumed that, for example, a preferred form of the boron compound is a state such that at least a part of the raw material is reacted with an element constituting the lithium-transition metal composite oxide to form a composite oxide including boron (hereinafter, may be referred to as "composite boron oxide"). As mentioned below, the lithium-transition metal composite oxide and the raw material compound for the boron compound are mixed with each other, and then calcined, so that the boron compound formed from the raw material compound is contained in a more effective form in the positive electrode composition. The reason for this is presumed, for example, that water of hydration contained in the boron compound is removed, that the proportion of the boron compound coating the surface of the lithium-transition metal composite oxide particles is increased, and that niobium in a certain amount or more is contained in the elements constituting the composite boron oxide. It is presumed that, when the composite boron oxide is a composite oxide including niobium and boron, the dissolution of molybdenum from the lithium-transition metal composite oxide particles into the electrolyte is extremely efficiently suppressed.

The positive electrode composition may be merely a mixture of the lithium-transition metal composite oxide and the boron compound, or may be in a form such that the boron compound coats the lithium-transition metal composite oxide particles. When the positive electrode composition is in a form such that the boron compound coats the lithium-transition metal composite oxide particles, for example, the dissolution of, niobium, molybdenum, or the like, from the lithium-transition metal composite oxide particles is more effectively suppressed.

With respect to the amount of the boron compound contained in the positive electrode composition, it is preferred that the boron compound is present in an amount of 2.0 mol % or less in terms of a boron element, based on the lithium-transition metal composite oxide. When the amount of the boron compound is too small, a satisfactory effect of the boron compound cannot be obtained, and, when the amount of the boron compound is too large, the charge-discharge capacity of the whole of the positive electrode composition tends to be lowered. A preferred amount of the boron compound is 0.5 to 1.5 mol % in terms of boron, based on the mole of the lithium-transition metal composite oxide.

It is preferred that the raw material compound for the boron compound is at least one member selected from the group consisting of a boron oxide, an oxoacid of boron, and a salt of an oxoacid of boron. In this case, the boron compound finally formed is likely to be in a form more suitable for the object of the present embodiment. Examples of oxoacids of boron and salts thereof include polyboric acids and salts thereof, such as orthoboric acid and salts thereof, metaboric acids and salts thereof, diboric acid and salts thereof, and triboric acid and salts thereof. With respect to the raw material compound for the boron compound, a single type of a raw material compound, or a combination of two or more types may be used.

When a salt of an oxoacid is used as the raw material compound, a lithium salt or ammonium salt of an oxoacid is preferred. Specific examples of such salts include lithium tetraborate ($Li_2B_4O_7$) and ammonium pentaborate ($NH_4B_5O_8$). These raw material compounds may have water of hydration.

With respect to the raw material compound for the boron compound, from the viewpoint of the ease of the handling of the raw material and the form of the boron compound finally formed, an oxoacid of boron is more preferred than a salt of an oxoacid of boron. Orthoboric acid (so-called general boric acid) is especially preferred.

Method for Producing Positive Electrode Composition

A method for producing a positive electrode composition includes the steps of: providing a lithium-transition metal composite oxide; mixing the provided lithium-transition metal composite oxide with a raw material compound for a boron compound to obtain a raw material mixture; and calcining the raw material mixture obtained in the mixing step to obtain a calcined material.

Providing

The lithium-transition metal composite oxide may be provided by synthesizing appropriately using a known method, or may be provided by obtaining a synthesized lithium-transition metal composite oxide. When the lithium-transition metal composite oxide is synthesized, for example, a method may be employed in which a mixed raw material containing elements constituting the lithium-transition metal composite oxide in a desired ratio is prepared, and the prepared mixed raw material is calcined at about 700° C. to 1,100° C. The raw material mixture can be prepared by, for example, a method in which raw material compounds capable of forming an oxide at a high temperature are mixed according to the intended composition, or a method in which raw material compounds soluble in a solvent are dissolved in the solvent, and precipitation of a precursor is caused in the resultant solution by, for example, adjusting the temperature or pH of the solution or adding a complexing agent to the solution.

Mixing

In the mixing, the lithium-transition metal composite oxide provided in the providing and a raw material compound for a boron compound are satisfactorily mixed with each other. The mixing may be made using, for example, an existing stirrer to an extent such that the distribution of the both components becomes even. The mixing is preferably made so that, for example, a mechanochemical effect causes the boron compound to be present, for example, in the form of coating the surface of the lithium-transition metal composite oxide particles. It is presumed that, in the mixing, at least a part of the raw material compound for the boron compound and, for example, lithium and niobium together form a composite oxide. With respect to the raw material compound, at least one member selected from the group consisting of a boron oxide, an oxoacid of boron, and a salt of an oxoacid of boron is preferably used. When a salt of an oxoacid of boron is used, a lithium salt or ammonium salt of an oxoacid of boron is preferred. As the raw material compound, an oxoacid of boron is more preferred, and orthoboric acid is especially preferred. Thus, the positive electrode composition of the present embodiment is obtained in the form of a mixture of the lithium-transition metal composite oxide and the boron compound.

Calcining

The raw material mixture obtained in the mixing is calcined to obtain a calcined material. In the obtained calcined material which is the positive electrode composition, the boron compound is present in a form such that a larger part of the boron compound coats the surface of the lithium-transition metal composite oxide particles. Particularly, the boron compound obtained through the calcining to coat the surface of the lithium-transition metal composite oxide particles is considered to form a chemical or physical bonding with the elements constituting the lithium-transition metal composite oxide so as to strongly unify with them, so that a structure is formed in which the dissolution of, for example, molybdenum is suppressed. In addition, moisture or water of hydration possibly contained in the raw material compounds and others is removed in the calcination step, and therefore it is considered that an effect of preventing the deterioration of properties caused due to water can be obtained.

When the calcination temperature is too high, it is likely that a reaction between the lithium-transition metal composite oxide and a boron compound (or the raw material compound) proceeds excessively that the inherent properties of the lithium-transition metal composite oxide are difficult to be satisfactorily exhibited. When the calcination temperature is too low, the satisfactory effect aimed at by the calcination step cannot be expected. A preferred range of the calcination temperature is 450° C. or lower, and a more preferred range is from 200° C. to 400° C.

Positive Electrode

The positive electrode for use in a non-aqueous electrolyte secondary battery of the present embodiment includes, for example, a current collector, and a positive electrode active material layer, disposed on the current collector, including the positive electrode composition. The positive electrode of the present embodiment is in a mode which is substantially the same as that generally used, except that the positive electrode composition of the present embodiment is used. A non-aqueous electrolyte secondary battery including the positive electrode of the present embodiment can achieve both satisfactory heat stability and satisfactory cycle characteristics.

Non-Aqueous Electrolyte Secondary Battery

The non-aqueous electrolyte secondary battery of the present embodiment includes, for example, the positive electrode of the present embodiment, a negative electrode, and a non-aqueous electrolyte, and optionally a separator disposed between the positive electrode and the negative electrode. For example, the negative electrode, non-aqueous electrolyte, and separator used in the present embodiment are in respective modes which are the same as those generally used. The non-aqueous electrolyte secondary battery of the present embodiment can achieve both satisfactory heat stability and satisfactory cycle characteristics.

EXAMPLES

Hereinbelow, the present embodiment will be described in more detail with reference to the following Examples, which should not be construed as limiting the present embodiment.

Example 1

Pure water in a reaction vessel was prepared, and, while stirring, respective aqueous solutions of nickel sulfate, cobalt sulfate, and manganese sulfate were dropwise added to the water in the vessel with a flow rate ratio between the aqueous solutions (Ni:Co:Mn) of 35:35:30. After completion of the addition of the aqueous solutions, the temperature of the resultant solution was adjusted to 50° C., and an aqueous sodium hydroxide solution in a predetermined amount was dropwise added to the solution to obtain a precipitate of a nickel-cobalt-manganese composite hydroxide. The obtained precipitate was washed with water, and subjected to filtration and separation, and then mixed with lithium carbonate, molybdenum(IV) oxide, and niobium(V) oxide with a Li:(Ni+Co+Mn):Mo:Nb ratio of 1.10:1:0.01:0.005 to obtain a mixed raw material. The obtained mixed raw material was calcined in an air atmosphere at 940° C. for 11 hours to obtain a sintered material. The obtained sintered material was pulverized, and subjected to dry sieving to obtain a lithium-transition metal composite oxide represented by the compositional formula: $Li_{1.10}Ni_{0.35}Co_{0.35}Mn_{0.3}Mo_{0.01}Nb_{0.005}O_2$.

To the obtained lithium-transition metal composite oxide was added boric acid as a raw material compound for boron compound so that the boric acid was present in an amount of 0.5 mol % in terms of boron, based on the mole of the lithium-transition metal composite oxide, and they were mixed with each other using a high speed shear mixer to obtain a raw material mixture. The obtained raw material mixture was calcined in air at 250° C. for 10 hours to obtain a positive electrode composition. The obtained composition was used as a positive electrode active material in Example 1.

Comparative Example 1

A precipitate of a nickel-cobalt-manganese composite hydroxide was obtained in the similar manner as in Example 1. The obtained precipitate was washed with water, and subjected to filtration and separation, and then mixed with lithium carbonate with a Li:(Ni+Co+Mn) ratio of 1.10:1 to obtain a mixed raw material. The obtained mixed raw material was calcined in an air atmosphere at 940° C. for 11 hours to obtain a sintered material. The obtained sintered material was pulverized, and subjected to dry sieving to obtain a lithium-transition metal composite oxide represented by the compositional formula: $Li_{1.10}Ni_{0.35}Co_{0.35}Mn_{0.3}O_2$. The obtained oxide was used as a positive electrode active material in Comparative Example 1.

Comparative Example 2

A precipitate of a nickel-cobalt-manganese composite hydroxide was obtained in the similar manner as in Example 1. The obtained precipitate was washed with water, and subjected to filtration and separation, and then mixed with lithium carbonate and molybdenum(IV) oxide with a Li:(Ni+Co+Mn):Mo ratio of 1.10:1:0.01 to obtain a mixed raw material. The obtained mixed raw material was calcined in an air atmosphere at 940° C. for 11 hours to obtain a sintered material. The obtained sintered material was pulverized, and subjected to dry sieving to obtain a lithium-transition metal composite oxide represented by the compositional formula: $Li_{1.10}Ni_{0.35}Co_{0.35}Mn_{0.3}Mo_{0.01}O_2$. The obtained oxide was used as a positive electrode active material in Comparative Example 2.

Comparative Example 3

The lithium-transition metal composite oxide obtained in Example 1 was used as a positive electrode active material in Comparative Example 3.

Comparative Example 4

A precipitate of a nickel-cobalt-manganese composite hydroxide was obtained in the similar manner as in Example 1. The obtained precipitate was washed with water, and subjected to filtration and separation, and then mixed with lithium carbonate, molybdenum(IV) oxide, and zirconium oxide with a Li:(Ni+Co+Mn):Mo:Zr ratio of 1.10:1:0.01:0.005 to obtain a mixed raw material. The obtained mixed raw material was calcined in an air atmosphere at 940° C. for 11 hours to obtain a sintered material. The obtained sintered material was pulverized, and subjected to dry sieving to obtain a lithium-transition metal composite oxide represented by the compositional formula: $Li_{1.10}Ni_{0.35}Co_{0.35}Mn_{0.3}Mo_{0.01}Zr_{0.005}O_2$.

To the obtained lithium-transition metal composite oxide was added boric acid as a raw material compound for boron compound so that the boric acid was present in an amount of 0.5 mol % in terms of boron, based on the mole of the lithium-transition metal composite oxide, and they were mixed with each other using a high shear mixer to obtain a raw material mixture. The obtained raw material mixture was calcined in air at 250° C. for 10 hours to obtain a positive electrode composition. The obtained composition was used as a positive electrode active material in Comparative Example 4.

Comparative Example 5

A lithium-transition metal composite oxide represented by the compositional formula: $Li_{1.10}Ni_{0.35}Co_{0.35}Mn_{0.3}Mo_{0.01}O_2$ was obtained in the similar manner as in Comparative Example 2. To the obtained lithium-transition metal composite oxide was added boric acid as a raw material compound for boron compound so that the boric acid was present in an amount of 0.5 mol % in terms of boron, based on the mole of the lithium-transition metal composite oxide, and they were mixed with each other using a high shear mixer to obtain a raw material mixture. The obtained raw material mixture was calcined in air at 250° C. for 10 hours to obtain a positive electrode composition. The obtained composition was used as a positive electrode active material in Comparative Example 5.

Comparative Example 6

A precipitate of a nickel-cobalt-manganese composite hydroxide was obtained in the similar manner as in Example 1. The obtained precipitate was washed with water, and subjected to filtration and separation, and then mixed with lithium carbonate and niobium(V) oxide with a Li:(Ni+Co+Mn):Nb ratio of 1.10:1:0.005 to obtain a mixed raw material. The obtained mixed raw material was calcined in an air atmosphere at 940° C. for 11 hours to obtain a sintered material. The obtained sintered material was pulverized, and subjected to dry sieving to obtain a lithium-transition metal composite oxide represented by the compositional formula: $Li_{1.10}Ni_{0.35}Co_{0.35}Mn_{0.3}Nb_{0.005}O_2$.

To the obtained lithium-transition metal composite oxide was added boric acid as a raw material compound for boron compound so that the boric acid was present in an amount of 0.5 mol % in terms of boron, based on the mole of the lithium-transition metal composite oxide, and they were mixed with each other using a high shear mixer to obtain a raw material mixture. The obtained raw material mixture was calcined in air at 250° C. for 10 hours to obtain a positive electrode composition. The obtained composition was used as a positive electrode active material in Comparative Example 6.

<Evaluation>

Evaluation of Output Characteristic

Using each of the positive electrode active materials in Example 1 and Comparative Examples 1 to 6, a battery for evaluation, which is a non-aqueous electrolyte secondary battery, was prepared in accordance with the procedure described below, and a DC-IR (direct current internal resistance) was measured with respect to the battery for evaluation by the method described below.

1. Preparation of Positive Electrode

85 Parts by weight of a positive electrode active material, 10 parts by weight of acetylene black, and 5.0 parts by weight of PVDF (polyvinylidene fluoride) were dispersed in NMP (N-methyl-2-pyrrolidone) to prepare a positive electrode slurry. The prepared positive electrode slurry was applied to an aluminum foil, and dried and then subjected to compression molding using a roller press, followed by cutting into a predetermined size, to obtain a positive electrode.

2. Preparation of Negative Electrode 97.5 Parts by weight of artificial graphite, 1.5 part by weight of CMC (carboxymethyl cellulose), and 1.0 part by weight of an SBR (styrene-butadiene rubber) were dispersed in water to prepare a negative electrode slurry. The prepared negative electrode slurry was applied to a copper foil, and dried and then subjected to compression molding using a roller press, followed by cutting into a predetermined size, to obtain a negative electrode.

3. Preparation of Non-Aqueous Electrolytic Solution

EC (ethylene carbonate) and MEC (methylethyl carbonate) were mixed in a volume ratio of 3:7 to obtain a mixed solvent. Lithium hexafluorophosphate ($LiPF_6$) was dissolved in the obtained mixed solvent so that the lithium hexafluorophosphate concentration became 1 mol/L to obtain a non-aqueous electrolytic solution.

4. Assembly of Battery for Evaluation

Lead electrodes were respectively attached to the current collectors of the above-obtained positive electrode and negative electrode, followed by vacuum drying at 120° C. Then, a separator made of porous polyethylene was placed between the positive electrode and the negative electrode, and the resultant material was contained in a laminate packaging container in a bag form. Then vacuum drying at 60° C. was performed to remove the moisture adsorbed. After vacuum drying, the above-prepared non-aqueous electrolytic solution was injected into the laminate packaging container, and the container was sealed to obtain a non-aqueous electrolyte secondary battery of a lamination type as a battery for evaluation.

5. Measurement of DC-IR

The obtained battery for evaluation was subjected to aging by allowing a weak current to flow through the battery, so that the electrolyte satisfactorily permeated through the positive electrode and negative electrode. Then, with respect to the resultant battery, a series of operations of discharging at a high current and charging at a weak current was repeatedly performed. The charge capacity obtained after the 10th charging operation was taken as the full charge capacity of the battery for evaluation, and, after the 10th discharging operation, the battery was charged to 40% of the full charge capacity. After the charging, the resultant battery for evaluation was placed in a thermostatic chamber set at −25° C. and left for 6 hours, and then discharging was performed at 0.02 A, 0.04 A, and 0.06 A to measure a voltage. Current values were taken for the abscissa and voltage values were taken for the ordinate, and the points of intersection of them were plotted, and the slope of a line obtained by connecting the points of intersection was determined as a DC-IR ($\Omega$). A lower DC-IR indicates satisfactory output characteristics.

Evaluation of Cycle Characteristic

Using each of the batteries for evaluation respectively using the positive electrode active materials in Example 1 and Comparative Examples 1 to 6, cycle characteristics were measured as follows.

A secondary battery for evaluation, which is the same as the battery for evaluation of the output characteristics, was subjected to aging at a weak current so that the electrolyte satisfactorily permeated through the positive electrode and negative electrode. After the aging, the resultant battery was placed in a thermostatic chamber set at 20° C. A series of the charging operation at a charge potential of 4.2 V and at a charge current of 1.0 C (1 C≡a current at which discharging is completed in 1 hour) and the discharging operation at a discharge potential of 2.75 V and at a discharge current of 1.0 C was taken as 1 cycle, and the cycle of charging and discharging operations was repeatedly performed with respect to the battery. A value obtained by dividing the discharge capacity in the n-th cycle by the discharge capacity in the 1st cycle was determined as a discharge capacity maintaining ratio (QsR (%)) for the n-th cycle. A higher discharge capacity maintaining ratio indicates satisfactory cycle characteristics.

Evaluation of Heat Stability

Using each of the positive electrode active materials in Example 1 and Comparative Examples 1 to 6, a battery for evaluation was prepared in accordance with the procedure described below, and differential scanning calorimetry (DSC) measurement was conducted with respect to the battery for evaluation by the method described below.

1. Preparation of Positive Electrode 90.0 Parts by weight of a positive electrode active material, 5.0 parts by weight of acetylene black, and 5.0 parts by weight of PVDF were dispersed in NMP to prepare a positive electrode slurry. The prepared positive electrode slurry was applied to an aluminum foil, and dried and then subjected to compression molding using a roller press, followed by cutting into a predetermined size, to obtain a positive electrode.

2. Preparation of Negative Electrode

A metallic lithium foil was cut into a predetermined size to obtain a negative electrode.

3. Preparation of Non-Aqueous Electrolytic Solution

A non-aqueous electrolytic solution was prepared in the similar manner as in the battery for evaluation of the output characteristics.

4. Assembly of Battery for Evaluation

The above-obtained positive electrode was placed on the bottom of a SUS casing, and the above-prepared non-aqueous electrolytic solution was injected in a predetermined amount into the casing. Then, a separator made of porous polyethylene was disposed on the positive electrode, and the non-aqueous electrolytic solution was injected in a predetermined amount into the casing. Then, the negative electrode was disposed on the separator, and finally, the top of the SUS casing was sealed up to obtain a non-aqueous electrolyte secondary battery of a SUS cell type as a battery for evaluation.

5. DSC Measurement

The obtained battery for evaluation was allowed to stand in a thermostatic chamber at 25° C. for 6 hours so that the electrolyte satisfactorily permeated through the positive electrode and negative electrode. Then, with respect to the resultant battery, constant-current constant-voltage charging was performed at a charge potential of 4.3 V and at a charge current of 0.2 C, and complete discharging was performed at a predetermined current. The complete discharging was performed successively at currents of 0.2 C, 1 C, 3 C, and 5 C, and the charging and discharging operation was repeated 4 times in total. After the 4th complete discharging, a charging was performed finally. After the final charging, the battery for evaluation was dismounted in an argon atmosphere, and the positive electrode was washed with MEC. After washing, the resultant positive electrode was subjected to vacuum drying at normal temperature for 30 minutes. After drying, the aluminum foil was removed from the positive electrode, and 2.5 mg of the remaining portion and 2 μL of the non-aqueous electrolytic solution separated upon dismounting the battery were placed in a SUS cell for DSC measurement. Then, the SUS cell was sealed up by caulking. The caulked SUS cell was set in a DSC measurement apparatus, and the SUS cell was heated (together with a standard reference cell) from normal temperature to 400° C. at 5° C./min to obtain a DSC spectrum. From the obtained DSC spectrum, a heat-generation starting temperature of the positive electrode active material was determined. A higher heat-generation starting temperature indicates satisfactory heat stability of the positive electrode active material.

With respect to each of Example 1 and Comparative Examples 1 to 6, the lithium-transition metal composite oxide (hereinafter, may be referred to as "constituent A"), the raw material compound for boron compound (hereinafter, may be referred to as "constituent B"), and the boron content (B content) in the positive electrode composition are shown in Table 1, and a DC-IR (R), the discharge capacity maintaining ratio (QsR) for the 200th cycle, and the heat-generation starting temperature (Tf) are shown in Table 2.

TABLE 2

|  | R/Ω | QsR/% | Tf/° C. |
|---|---|---|---|
| Example 1 | 12.9 | 81.6 | 238 |
| Comparative example 1 | 18.1 | 79.5 | 210 |
| Comparative example 2 | 13.6 | 0 | 234 |
| Comparative example 5 | 14.1 | 57.5 | 236 |
| Comparative example 3 | 13.4 | 0 | 231 |
| Comparative example 4 | 15.1 | 77.2 | 241 |
| Comparative example 6 | 15.1 | 85.4 | 213 |

As apparent from Comparative Example 1 and Example 1 and Comparative Examples 2 and 3, when molybdenum is contained in the composition of constituent A, the heat stability is improved. However, as also apparent from Comparative Examples 2 and 3, when merely molybdenum is contained, the cycle characteristics become markedly poor. In Comparative Examples 4, 5, and 6 in which boric acid is used as constituent B, the cycle characteristics are improved to some extent but are not satisfactory. It is found that when boric acid is contained as constituent B and niobium is contained in the composition of constituent A, the cycle characteristics and heat stability are satisfactorily improved. In Example 1 in which molybdenum and niobium are contained in the composition of constituent A and boric acid is used as constituent 13, excellent properties are obtained such that the cycle characteristics are higher than those in Comparative Example 1 and the heat stability is higher than those in Comparative Examples 2 and 3. On the other hand, as also apparent from Comparative Example 3, when merely niobium is contained in the composition of constituent A, the deterioration of the cycle characteristics due to molybdenum cannot be satisfactorily improved. Further, it is found that, in Example 1 in which the characteristic features of the present embodiment are satisfied, the output characteristics are also improved.

By using the positive electrode composition of the present embodiment, it is possible to obtain a non-aqueous electrolyte secondary battery having satisfactory heat stability and satisfactory cycle characteristics as well as satisfactory output characteristics. Therefore, the non-aqueous electrolyte secondary battery using the positive electrode composition of the present embodiment can be especially used in a power source which is required to be safe and exhibit a high output repeatedly, for example, a battery for an electric vehicle.

As described above, it should be obvious that various other embodiments are possible without departing the spirit

TABLE 1

|  | Constituent A | Constituent B | Calcination temperature/° C. | B Content/mol % |
|---|---|---|---|---|
| Example 1 | $Li_{1.10}Ni_{0.35}Co_{0.35}Mn_{0.3}Mo_{0.01}Nb_{0.005}O_2$ | $H_3BO_3$ | 250 | 0.5 |
| Comparative example 1 | $Li_{1.10}Ni_{0.35}Co_{0.35}Mn_{0.3}O_2$ | — | — | — |
| Comparative example 2 | $Li_{1.10}Ni_{0.35}Co_{0.35}Mn_{0.3}Mo_{0.01}O_2$ | — | — | — |
| Comparative example 5 | $Li_{1.10}Ni_{0.35}Co_{0.35}Mn_{0.3}Mo_{0.01}O_2$ | $H_3BO_3$ | 250 | 0.5 |
| Comparative example 3 | $Li_{1.10}Ni_{0.35}Co_{0.35}Mn_{0.3}Mo_{0.01}Nb_{0.005}O_2$ | — | — | — |
| Comparative example 4 | $Li_{1.10}Ni_{0.35}Co_{0.35}Mn_{0.3}Mo_{0.01}Zr_{0.005}O_2$ | $H_3BO_3$ | 250 | 0.5 |
| Comparative example 6 | $Li_{1.10}Ni_{0.35}Co_{0.35}Mn_{0.3}Nb_{0.005}O_2$ | $H_3BO_3$ | 250 | 0.5 |

What is claimed is:

1. A positive electrode composition for a non-aqueous electrolyte secondary battery, the composition comprising a lithium-transition metal composite oxide represented by the following formula:

$Li_aNi_{1-x-y}Co_xM^1_yM^2_zMo_\alpha Nb_\beta O_2$ wherein $1.00 \leq a \leq 1.50$, $0.00 \leq x \leq 0.50$, $0.00 \leq y \leq 0.50$, $0.000 \leq z \leq 0.020$, $0.002 \leq \alpha \leq 0.020$, $0.002 \leq \beta \leq 0.020$, and $0.00 \leq x+y \leq 0.70$, $M^2$ represents at least one element selected from the group consisting of Zr, Ti, Mg, Ta, and V, and a boron compound comprising a calcined product of orthoboric acid or a salt thereof.

2. The positive electrode composition according to claim 1, wherein an amount of the boron compound is 2.0 mol % or less in terms of boron, based on the mole of the lithium-transition metal composite oxide.

3. The positive electrode composition according to claim 2, wherein a raw material compound for the boron compound is orthoboric acid.

4. The positive electrode composition according to claim 2, wherein a calcination temperature employed for obtaining the calcined product is 450° C. or lower.

5. The positive electrode composition according to claim 1, wherein a raw material compound for the boron compound is orthoboric acid.

6. The positive electrode composition according to claim 1, wherein a calcination temperature employed for obtaining the calcined product is 450° C. or lower.

7. A positive electrode for use in a non-aqueous electrolyte secondary battery, the positive electrode comprising the positive electrode composition for a non-aqueous electrolyte secondary battery according to claim 1.

8. A non-aqueous electrolyte secondary battery comprising the positive electrode according to claim 7, a negative electrode, and a non-aqueous electrolyte.

9. The positive electrode composition according to claim 1, wherein $0.3 \leq y \leq 0.50$.

10. The positive electrode composition according to claim 1, wherein $\alpha = 0.01$ and $\beta = 0.005$.

11. A method for producing a positive electrode composition for a non-aqueous electrolyte secondary battery, the method comprising:

providing a lithium-transition metal composite oxide represented by the following compositional formula:

$Li_aNi_{1-x-y}Co_xM^1_yM^2_zMo_\alpha Nb_\beta O_2$ wherein $1.00 \leq a \leq 1.50$, $0.00 \leq x \leq 0.50$, $0.00 \leq y \leq 0.50$, $0.000 \leq z \leq 0.020$, $0.002 \leq \alpha \leq 0.020$, $0.002 \leq \beta \leq 0.020$, and $0.00 \leq x+y \leq 0.70$, $M^2$ represents at least one element selected from the group consisting of Zr, Ti, Mg, Ta, and V;

mixing the provided lithium-transition metal composite oxide with orthoboric acid to obtain a raw material mixture; and calcining the obtained raw material mixture at a calcination temperature from 200° C. to 400° C.

12. The method according to claim 11, wherein the calcination for the raw material mixture is conducted at a calcination temperature between 200° C. and 250° C.

13. The method according to claim 11, wherein $0.3 \leq y \leq 0.50$.

14. The method according to claim 11, wherein $\alpha = 0.01$ and $\beta = 0.005$.

* * * * *